United States Patent
Vaccaro et al.

(10) Patent No.: US 11,238,762 B2
(45) Date of Patent: Feb. 1, 2022

(54) HANGER FOR MOUNTING CABLES

(71) Applicant: CommScope Technologies LLC, Hickory, NC (US)

(72) Inventors: Ronald A. Vaccaro, Taylorsville, NC (US); Aviral Joshi, Chicago, IL (US); Taig S. Rajpal, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/195,809

(22) Filed: Mar. 9, 2021

(65) Prior Publication Data

US 2021/0192992 A1 Jun. 24, 2021

Related U.S. Application Data

(60) Division of application No. 16/360,485, filed on Mar. 21, 2019, now Pat. No. 11,004,367, which is a
(Continued)

(51) Int. Cl.
*F16L 3/00* (2006.01)
*G09F 15/00* (2006.01)
(Continued)

(52) U.S. Cl.
CPC .......... *G09F 15/0018* (2013.01); *E01F 9/608* (2016.02); *E01F 9/65* (2016.02);
(Continued)

(58) Field of Classification Search
None
See application file for complete search history.

(56) References Cited

U.S. PATENT DOCUMENTS 4,958,792 A 9/1990 Rinderer
6,161,804 A 12/2000 Paske et al.
(Continued)

FOREIGN PATENT DOCUMENTS

CN 1260605 A 7/2000
FR 2417870 9/1979
(Continued)

OTHER PUBLICATIONS

"Extended European Search Report corresponding to European Application No. 16773786.5 dated Oct. 5, 2018".
(Continued)

*Primary Examiner* — Steven M Marsh
(74) *Attorney, Agent, or Firm* — Myers Bigel, P.A.

(57) ABSTRACT

A cable hanger includes: a base panel having opposed ends; a pair of arms, each of the arms attached to a respective end of the base panel and having a free end; a pair of locking projections, each of the locking projections attached to a respective free end of the arms; and a pair of gripping members, each gripping member attached to a respective arm, each gripping member having opposed ends, wherein one of the ends of each gripping member is fixed to the arms and the other of the ends of each gripping member is fixed to the arm or to the base panel. The arms and locking projections are configured to spread apart to enable insertion of a cable between the arms, wherein the gripping projections engage and grip the cable, and wherein the locking projections are configured to be inserted into the aperture of the supporting structure.

16 Claims, 10 Drawing Sheets

Related U.S. Application Data continuation of application No. 16/114,707, filed on Aug. 28, 2018, now abandoned, which is a division of application No. 15/834,766, filed on Dec. 7, 2017, now Pat. No. 10,158,218, which is a division of application No. 15/081,177, filed on Mar. 25, 2016, now Pat. No. 9,866,004.

(60) Provisional application No. 62/248,460, filed on Oct. 30, 2015, provisional application No. 62/206,558, filed on Aug. 18, 2015, provisional application No. 62/139,057, filed on Mar. 27, 2015.

(51) Int. Cl.

| | | |
|---|---|---|
| *F16B 1/00* | (2006.01) | |
| *H02G 3/32* | (2006.01) | |
| *E01F 9/608* | (2016.01) | |
| *E01F 9/65* | (2016.01) | |
| *F16B 2/24* | (2006.01) | |
| *F16B 5/06* | (2006.01) | |
| *G09F 23/00* | (2006.01) | |

(52) U.S. Cl.
CPC ............ *F16B 1/00* (2013.01); *G09F 15/0037* (2013.01); *G09F 15/0062* (2013.01); *G09F 15/0075* (2013.01); *H02G 3/32* (2013.01); *F16B 2/243* (2013.01); *F16B 5/0685* (2013.01); *G09F 23/00* (2013.01)

(56) References Cited

U.S. PATENT DOCUMENTS

| | | | |
|---|---|---|---|
| 6,257,530 B1 | 7/2001 | Tsai | |
| 6,354,543 B1 | 3/2002 | Paske | |
| 7,097,142 B1 | 8/2006 | Schmidt | |
| 7,146,688 B2 | 12/2006 | Yi | |
| 7,293,745 B2 | 11/2007 | Catapano | |
| 8,011,621 B2 | 9/2011 | Korczak | |
| 8,079,561 B2* | 12/2011 | Jafari | H02G 3/126 |
| | | | 248/231.81 |
| 8,191,836 B2 | 6/2012 | Korczak | |
| 8,439,316 B2 | 5/2013 | Feige | |
| 9,306,380 B2 | 4/2016 | Vaccaro | |
| 9,903,510 B2* | 2/2018 | Joshi | F16L 3/13 |
| 10,637,226 B2* | 4/2020 | Bell | H02G 3/32 |
| 10,927,980 B2* | 2/2021 | Varale | H02G 3/32 |
| 2002/0005463 A1 | 1/2002 | Paske et al. | |
| 2005/0109890 A1 | 5/2005 | Korczak et al. | |
| 2009/0230256 A1 | 9/2009 | Widlacki et al. | |
| 2009/0294602 A1 | 12/2009 | Korczak | |
| 2010/0000763 A1 | 1/2010 | Stansberry | |
| 2010/0264277 A1 | 10/2010 | Gardner | |
| 2011/0226913 A1 | 9/2011 | Feige | |
| 2016/0281881 A1 | 9/2016 | Vaccaro et al. | |
| 2018/0045336 A1 | 2/2018 | Vaccaro | |
| 2018/0163899 A1 | 6/2018 | Rajpal et al. | |
| 2018/0172183 A1 | 6/2018 | Joshi et al. | |

FOREIGN PATENT DOCUMENTS

| | | |
|---|---|---|
| GB | 1031573 A | 6/1966 |
| GB | 2014644 | 8/1979 |

OTHER PUBLICATIONS

"Extended European Search Report corresponding to European Patent Application No. 20185679.6 dated Sep. 30, 2020, 8 pages".
"International Search Report and Written Opinion for corresponding PCT Application No. PCT/US2016/023939, dated Aug. 24, 2016, 11 pages."
"Office Action corresponding to Chinese Application No. 201910515191.8 dated Jun. 15, 2020".
"Office Action corresponding to Chinese Application No. 201910515191.8 dated Jan. 13, 2021".

* cited by examiner

HANGER FOR MOUNTING CABLES

RELATED APPLICATIONS

The present application is a divisional of and claims priority to U.S. patent application Ser. No. 16/360,485, filed Mar. 21, 2019, which is a continuation of and claims priority to U.S. patent application Ser. No. 16/114,760, filed Aug. 28, 2018, now U.S. Pat. No. 10,243,339, which is a divisional of and claims priority to U.S. patent application Ser. No. 15/834,766, filed Dec. 7, 2017, now U.S. Pat. No. 10,158,218, which is a divisional of U.S. patent application Ser. No. 15/081,177, filed Mar. 25, 2016, now U.S. Pat. No. 9,866,004 and claims priority from the benefit of U.S. Provisional Patent Application Nos. 62/139,057, filed Mar. 27, 2015; 62/206,558, filed Aug. 18, 2015; and 62/248,460, filed Oct. 30, 2015, the disclosures of which are hereby incorporated herein by reference in their entirety.

FIELD OF THE INVENTION

This invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger.

One variety of cable hanger of this type is the SNAP-STAK® hanger, available from CommScope, Inc. (Joliet, Ill.). The SNAP-STAK® hanger is offered in multiple sizes that correspond to the outer diameters of different cables. This arrangement has been suitable for use with coaxial power cables, which tend to be manufactured in only a few different outer diameters; however, the arrangement has been less desirable for fiber optic cables, which tend to be manufactured in a much greater variety of diameters. Moreover, fiber optic cables tend to be much heavier than coaxial cables (sometimes as much as three times heavier per unit foot), which induces greater load and stress on the hangers.

SUMMARY

As a first aspect, embodiments of the invention are directed to a cable hanger for securing a cable to a supporting structure having an aperture. The cable hanger comprises: a base panel having opposed ends; a pair of arms, each of the arms attached to a respective end of the base panel and having a free end; a pair of locking projections, each of the locking projections attached to a respective free end of the arms; and a pair of gripping members, each gripping member attached to a respective arm, each gripping member having opposed ends, wherein one of the ends of each gripping member is fixed to the arms and the other of the ends of each gripping member is fixed to the arm or to the base panel. The arms and locking projections are configured to spread apart to enable insertion of a cable between the arms, wherein the gripping projections engage and grip the cable, and wherein the locking projections are configured to be inserted into the aperture of the supporting structure.

As a second aspect, a cable hanger for securing a cable to a supporting structure having an aperture comprises: a base panel having opposed ends; a pair of arms, each of the arms attached to a respective end of the base panel and having a free end; a pair of locking projections, each of the locking projections attached to a respective free end of the arms; and a pair of gripping members, each gripping member attached to a respective arm, each gripping member having opposed ends, wherein one of the ends is fixed to a respective arm or to the base panel, and wherein the other of the ends engages a feature mounted to the arm. The arms and locking projections are configured to spread apart to enable insertion of a cable between the arms, wherein the gripping projections engage and grip the cable, and wherein the locking projections are configured to be inserted into the aperture of the supporting structure.

As a third aspect, a cable hanger for securing a cable to a supporting structure having an aperture comprises: a base panel having opposed ends; a pair of arms, each of the arms attached to a respective end of the base panel and having a free end; a pair of locking projections, each of the locking projections attached to a respective free end of the arms; and a pair of gripping members, each gripping member attached to a respective arm, each gripping member having opposed ends, wherein a first end of each of the gripping members is fixed to a respective arm or to the base panel, and wherein a second end of each of the gripping members includes a locking feature that is configured to interlock with a second end of the other gripping member. The arms and locking projections are configured to spread apart to enable insertion of a cable between the arms, wherein the gripping projections engage and grip the cable, and wherein the locking projections are configured to be inserted into the aperture of the supporting structure.

As a fourth aspect, a cable hanger for securing a cable to a supporting structure having an aperture comprises: a base panel having opposed ends; a pair of arms, each of the arms attached to a respective end of the base panel and having a free end; a pair of locking projections, each of the locking projections attached to a respective free end of the arms; a pair of flex members, each flex member attached to a respective arm, each flex member having opposed ends, wherein one of the ends of each flex member is fixed to the arms and the other of the ends of each flex member is fixed to the arm or to the base panel; and a cantilevered gripping member extending from each flex member. The arms and locking projections are configured to spread apart to enable insertion of a cable between the arms, wherein the cantilevered gripping members engage and grip the cable, and wherein the locking projections are configured to be inserted into the aperture of the supporting structure.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein, rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
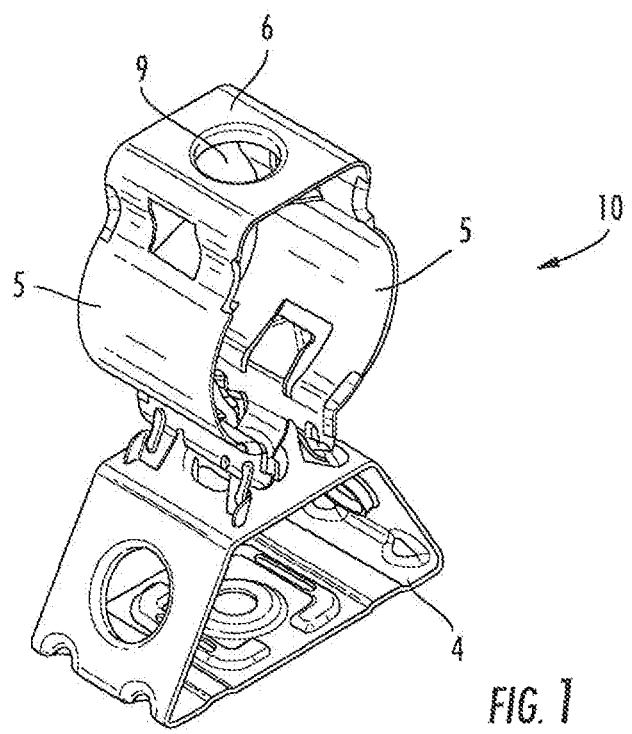
FIG. 1 is a perspective view of a prior art cable hanger.
Figure 2:
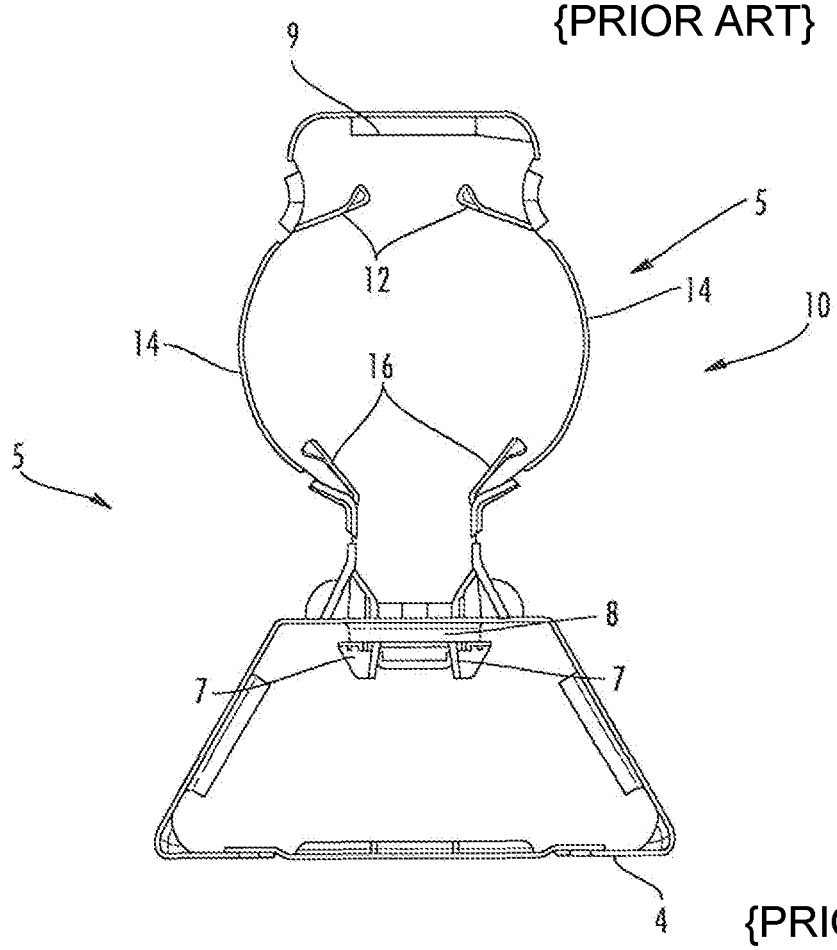
FIG. 2 is a top view of the prior art cable hanger of FIG. 1.

Referring now to the figures, a prior art cable hanger, designated broadly at 10, is shown in FIGS. 1 and 2. The hanger 10 includes curved arms 5 that extend from a flat base 6. Locking projections 7 extend from the free ends of the arms 5. As can be seen in FIGS. 1 and 2, the locking projections 7 are inserted into a reinforced hole 8 in a tower structure 4 to mount the hanger 10 thereon. The base 6 of the hanger 10 includes a reinforced hole 9 that can receive the projections of another hanger 10 to mount a second cable.

As can be best seen in FIG. 2, the arms 5 include arcuate sections 14 that together generally define a circle within which a cable can be grasped. Two cantilevered tabs 12 extend radially inwardly and toward the base 6 at one end of the arcuate sections 14, and two cantilevered tabs 16 extend radially inwardly and toward the base 6 from the opposite ends of the arcuate sections 14. The cantilevered tabs 12, 16 are deployed to deflect radially outwardly when the hanger 10 receives a cable for mounting; this deflection generates a radially inward force from each tab 12,16 that grips the jacket of the cable.

As discussed above, fiber optic cables tend to be much denser than coaxial cables, and therefore generate a much greater load than coaxial cables of similar diameter. Also, fiber optic cables are currently offered in a larger variety of outer diameters. Accordingly, the hanger 10 may not be suitable for the mounting of some fiber optic cables.

Figure 3:
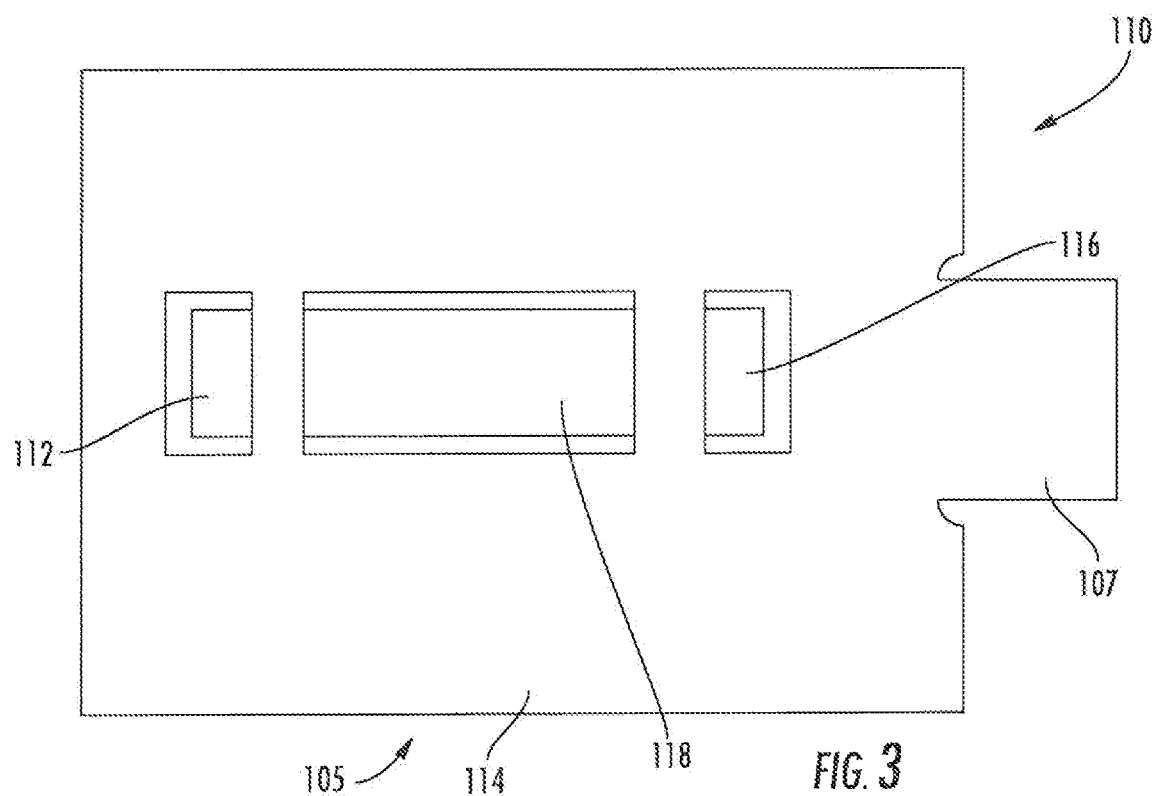
FIG. 3 is a side view of a cable hanger according to embodiments of the invention.
Figure 4:
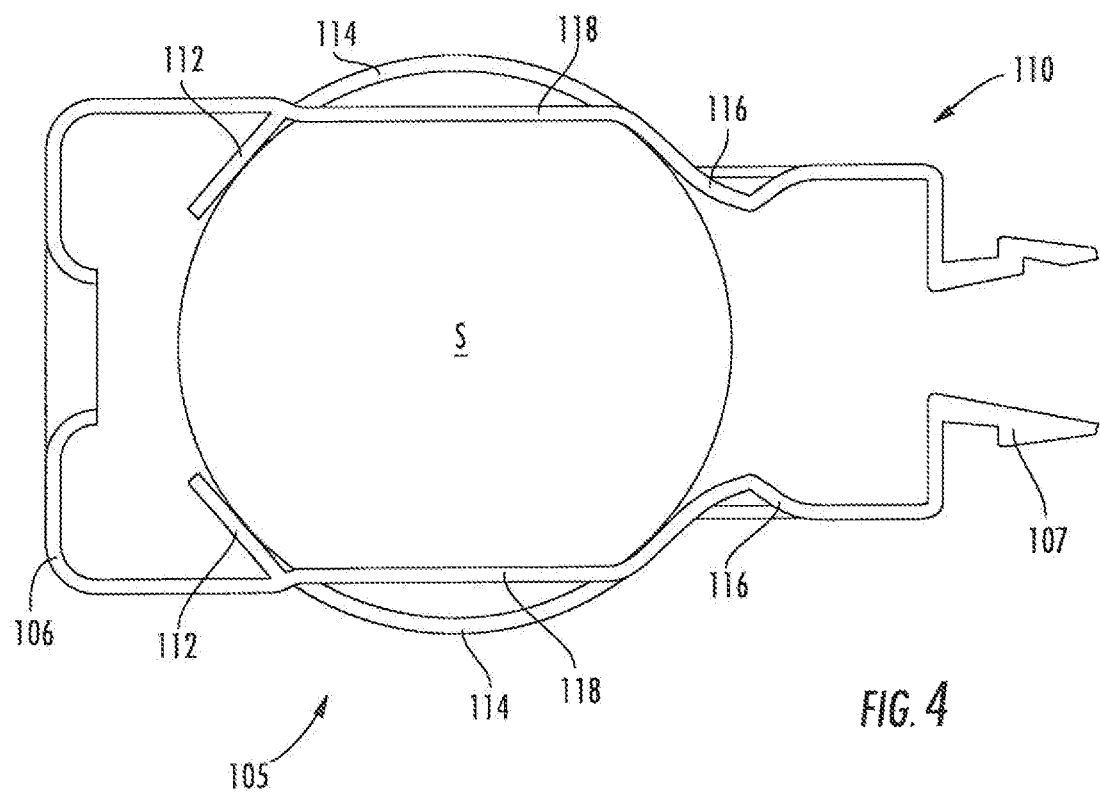
FIG. 4 is a top view of the cable hanger of FIG. 3.

A hanger that may address some of the issues above is illustrated in FIGS. 3 and 4 and designated broadly at 110. The hanger 110 has abase 106, curved arms 105 and locking projections 107 that are similar to those of the hanger 10 discussed above. However, rather than having only cantilevered tabs extending from the arms, the hanger 110 has cantilevered locating projections 112, 116 and straight gripping members 118. These are described in greater detail below.

The locating projections 112 are positioned near the ends of the arcuate sections 114 near the base 106. As can be seen in FIG. 4, each locating projection 112 extends away from its respective arm 105 at an angle that is generally tangent to the outer diameter of a cable captured within the arms 105. Similarly, the locating projections 116 are positioned near the ends of the arcuate sections 114 near the locking projections 107, and extend generally tangent to the outer diameter of a cable captured by the arms 105. Each of the gripping members 118 is fixed at both ends of a respective arcuate section 114 and extends as a straight beam to define a chord of the arcuate section 114.

When the hanger 110 is used to mount a cable, the arms 105 are spread to enable the cable to slip between the locking projections 107 and into the space S between the arms 105. The locating projections 112, 116 can help to locate the cable within the space S. The outer surface of the jacket of the cable presses into and deflects the gripping members 118; this deflection provides a gripping force on the jacket that can hold the cable in place.

The gripping force of the gripping members 118 can be considerably higher than that provided by the cantilevered tabs 12,16 of the prior hanger 10. The force applied by a deflected cantilevered beam can be calculated as $$N = (3DEI)/L^3 \qquad (1)$$

wherein
N=the force normal to the beam;
D=the amount of deflection experienced by the beam;
E=elastic modulus of the material of the beam;
I=moment of inertia through the cross-section of the beam; and
L=length of the beam.
In contrast, the force applied by a deflected beam fixed at both ends is:

$$N = (192DEI)/L^3 \qquad (2)$$

wherein N, D, E, I and L are as defined above in equation (1). Thus, for a beam of equal length and cross-section (such that L and I are the same in both equations), and formed of the same material (such that E is the same in both equations), the force generated by an equal deflection is 64 times greater (i.e., 192/3) by a beam fixed at both ends than by a cantilevered beam.

Accordingly, assuming that the deflection of the gripping members 118 is essentially the same as that of the tabs 12, 16, the gripping members 118 exert 64 times as much gripping force onto the cable jacket as the tabs 12, 16. This markedly increased gripping force can assist in the mounting of heavier cables, such as fiber optic cables.

Figure 14:
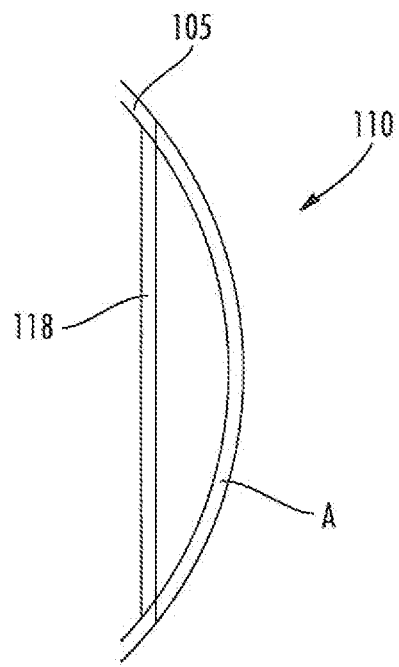
FIG. 14 is a partial top view of the cable hanger of FIG. 3.
Figure 15:
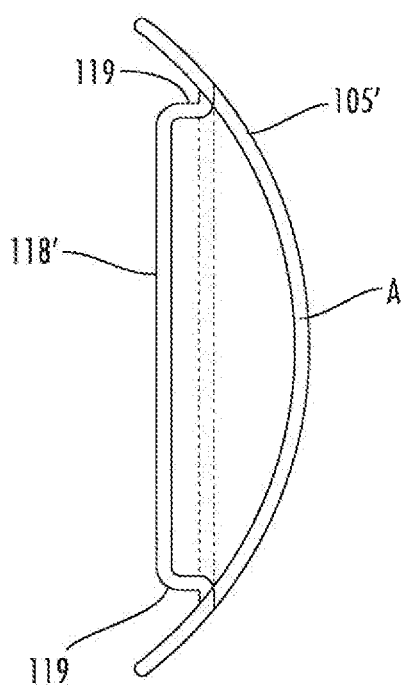
FIG. 15 is a partial top view of a cable hanger according to additional embodiments of the invention.

This concept can be applied in different ways. For example, FIG. 14 is a partial top view of an arm 105 and gripping member 118 of the cable hanger 110. As can be seen in FIG. 14, the length of the gripping member 118 is less than that of the length of the arcuate section A of the arm 105 extending between the ends of the gripping member 118. As such, if the arm 105 and gripping member 118 were stamped from a single sheet of metal (such as sheet steel), their different lengths should be accounted for. One technique for doing so is illustrated in FIG. 15, wherein the gripping member 118' is offset from the arm 105' by two bridge segments 119. The bridge segments 119 may be sized such that each bridge segment 119 has a length that is approximately half of the difference in length between the gripping member 118' and the arcuate section A. Employing bridge members 119 of this size would render the combined bridge members 119 and gripping member 118' approximately the same length as the arcuate section A, which would facilitate stamping the cable hanger 110 from a single sheet of metal. The mismatch in lengths between the gripping member 118 and the arcuate section A may also be addressed by including curvature (e.g., concave or convex) in the gripping member 118.

Figure 5:
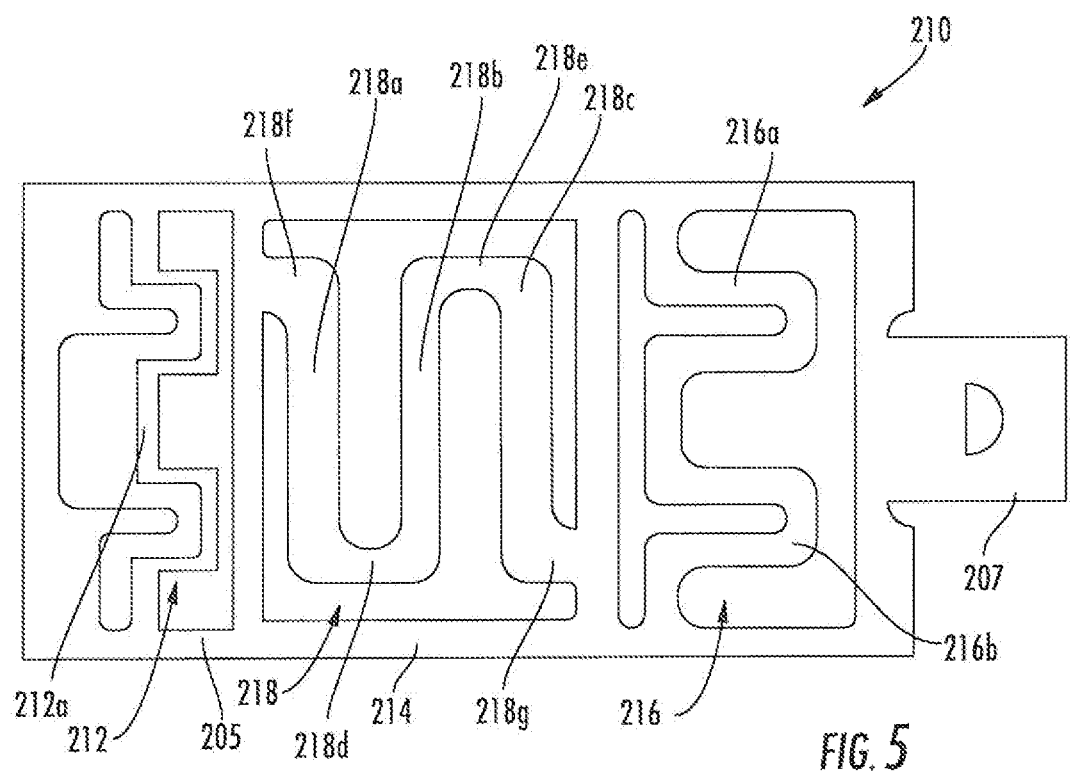
FIG. 5 is a side view of a cable hanger according to alternative embodiments of the invention.
Figure 6:
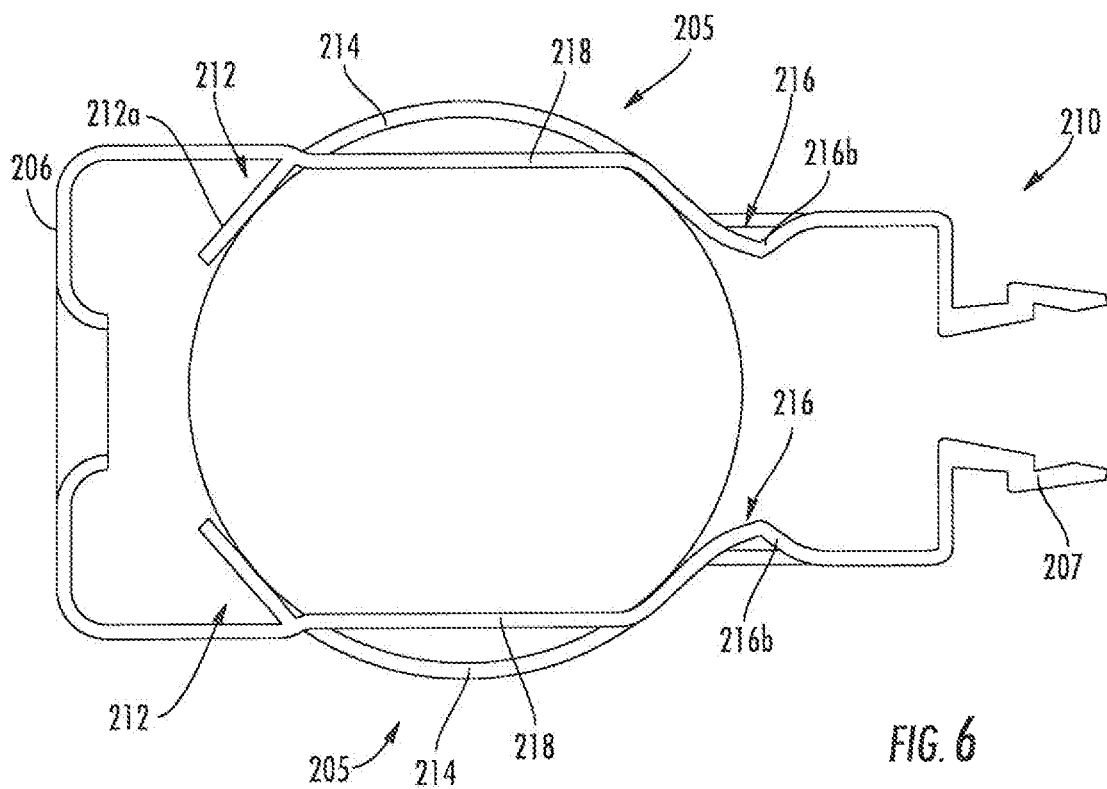
FIG. 6 is a top view of the cable hanger of FIG. 5.

Referring now to FIGS. 5 and 6, another embodiment of a cable hanger, designated broadly at 210, is shown therein. The hanger 210 has a base 206, curved arms 205 and locking projections 207 that are similar to those of the hangers 10, 110 discussed above. However, rather than having only cantilevered tabs extending from the arms, the hanger 210 has serpentine locating projections 212, 216 and serpentine gripping members 218. These are described in greater detail below.

The locating projections 212 are positioned near the ends of the arcuate sections 214 near the base 206. As can be seen in FIG. 5, each locating projection 212 has a central portion 212a that extends away from its respective arm 205 at an angle that is generally tangent to the outer diameter of a cable captured within the arms 205. Similarly, the locating projections 216 are positioned near the ends of the arcuate sections 214 near the locking projections 207 and have coils 216a, 216b that extend generally tangent to the outer diameter of a cable captured by the arms 205.

Each of the gripping members 218 is fixed at both ends of a respective arcuate section 214. Each gripping member 218 includes three vertical runs 218a, 218b, 218c connected by two horizontal runs 218d, 218e. The vertical run 218a is attached to the arm 205 at its upper end via a bridge 218f, and the vertical run 218c is attached to the arm 205 at its lower end via a bridge 218g. The vertical runs 218a, 218b, 218c, the horizontal runs 218d, 218e, and the bridges 218f, 218g define generally a vertical plane that forms a chord within the arcuate section 214 of the arm 205.

In the same manner described above for the hangers 10, 110, the hanger 210 is deployed by separating the arms 205 to permit insertion of a cable. The outer surface of the jacket of the cable presses into and deflects the gripping members 218, which generates a gripping force on the jacket that can hold the cable in place.

Although the gripping members 218 are beams with fixed ends in the manner of gripping members 218 above, the gripping force generated by the gripping members 218 will be somewhat less than that of a straight beam of similar horizontal span due to the ability of the gripping members 218 to twist along the vertical runs 218a, 218b, 218c. As such, a serpentine arrangement such as that shown herein can reduce the gripping force of a cable should a lower force be needed (for example, to enable the arms 205 to close sufficiently to insert the locking projections 207 into a mounting hole), and can be employed to "tune" the magnitude of the gripping force. Similarly, the serpentine arrangement of the locating projections 212, 216 can reduce the force imparted by these structures to the cable.

Figure 7:
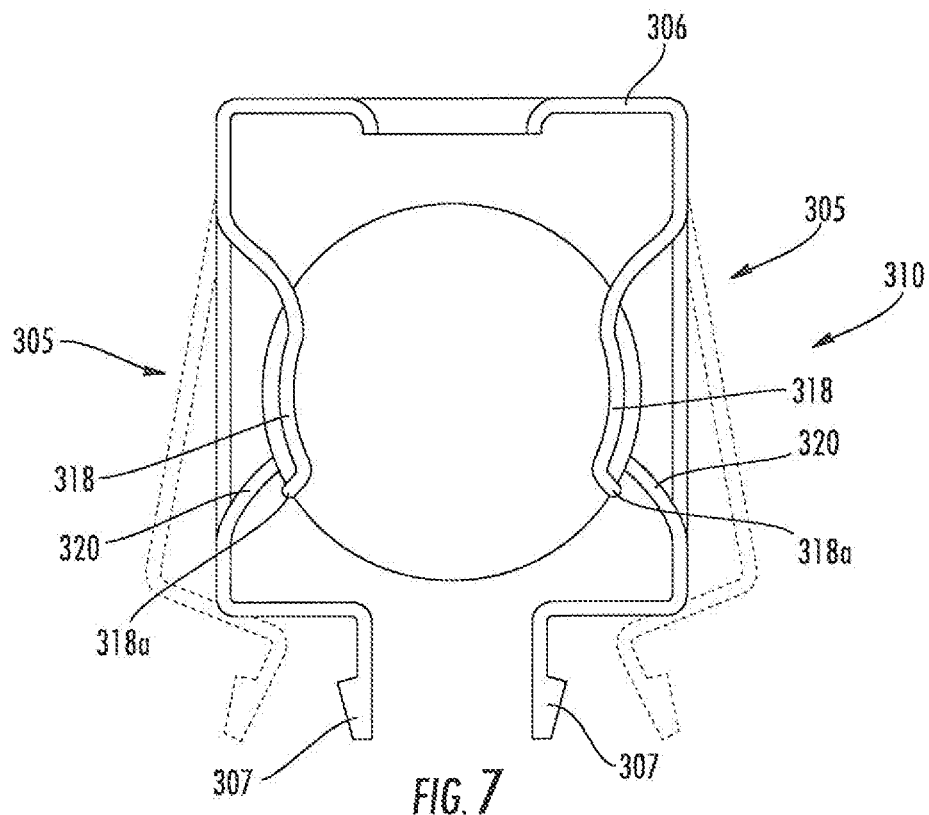
FIG. 7 is a top view of a cable hanger according to additional embodiments of the invention.
Figure 8:
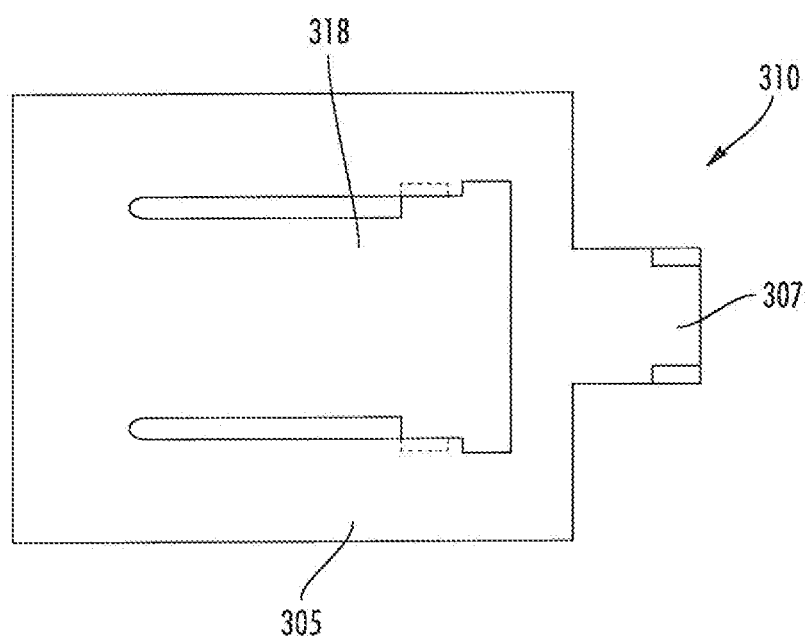
FIG. 8 is a side view of the cable hanger of FIG. 7.

Another embodiment of a cable hanger, designated broadly at 310, is illustrated in FIGS. 7 and 8. The hanger 310 has a base 306, arms 305 and locking projections 307 that are similar to those of the hangers 10, 110, 210 discussed above; however, as can bee seen in FIGS. 7 and 8, the arms 305 are relatively straight and lack arcuate sections. Also, the hanger 310 lacks locating projections, and includes arcuate gripping members 318 that are fixed at one end near the base 306. Each gripping member 318 is supported at its opposite end by a respective a brace 320 or other feature that extends inwardly from the end of the arm 305 near the locking projections 307. The gripping members 318 include bent tips 318a that engage the ends of the braces 320.

As can be seen in FIG. 7, the cable hanger 310 receives a cable between the arcuate surfaces of the gripping members 318. As the gripping members 318 deflect to receive the cable, the tips 318a engage the braces 320. The presence of the braces 320 supporting the tips 318a of the gripping members 318 provide support that can be approximated as a "pinned" joint (i.e., a hinge joint, wherein the member rotates about the joint but does not translate in any direction relative to the joint). The equation for calculating the force generated for a beam that is fixed at one end and pinned at the opposite end is approximately:

$$N = (6DEI)/L^3 \qquad (3)$$

wherein N, D, E, I and L are as defined above in Equations (1) and (2). (The denominator of Equation 3 is not exactly L, but is calculated with a lengthy equation that simplifies to approximately L, so for simplicity L is used herein). Thus, for a given length of beam and deflection, the normal force is approximately twice the magnitude exerted by a cantilevered beam.

Applying equation (3) to the gripping members 318 of the cable hanger 310, the gripping members 318 should provide approximately twice the gripping force to a cable that cantilevered gripping members of similar length would provide.

Figure 9:
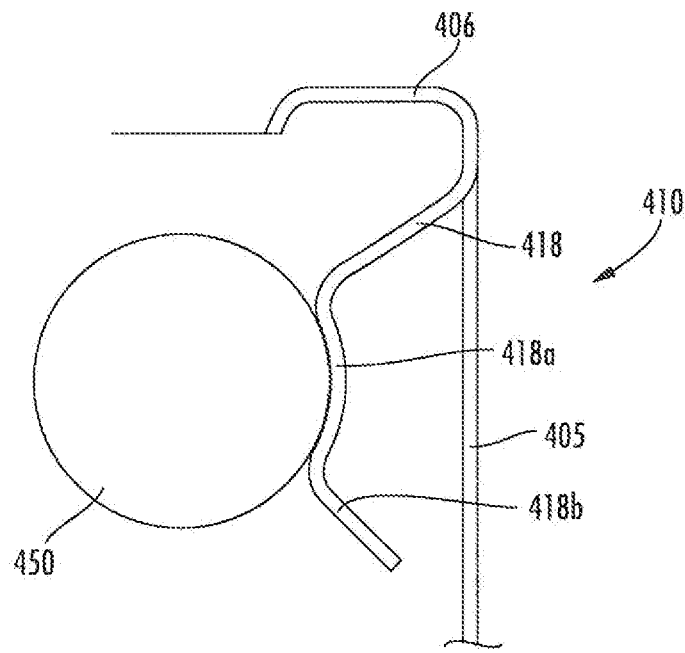
FIG. 9 is a partial top view of a cable hanger according to further embodiments of the invention with a smaller diameter cable in place.
Figure 10:
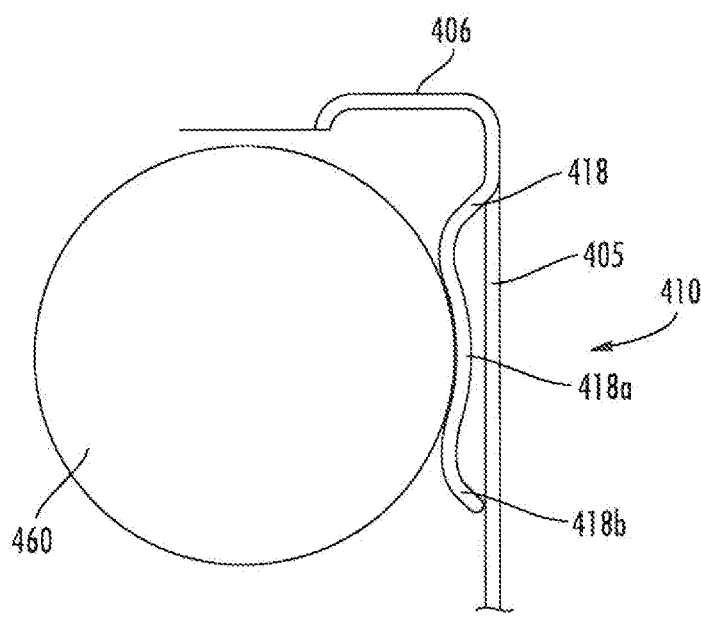
FIG. 10 is a partial top view of the cable hanger of FIG. 9 with a larger diameter cable in place.

Referring now to FIGS. 9 and 10, another embodiment of a cable hanger, designated broadly at 410, is shown therein. As can be seen in the partial view of FIGS. 9 and 10, the hanger 410 has a base 406 and arms 405 (only one of which is shown in FIGS. 9 and 10); the cable hanger 410 has locking projections on the arms 405 that are not shown in the figures. The cable hanger 410 includes gripping members 418 with arcuate sections 418a and angled tips 418b that are mounted as cantilevered beams in an undeflected state. When, as shown in FIG. 9, a relatively small diameter cable 450 is mounted within the gripping members 418, the deflection of the gripping members 418 is sufficiently small that the tips 418b of the gripping members do not contact the arms 405. As a result, the gripping force imparted to the cable 450 by the gripping members 418 can be calculated using Equation (1) above for a cantilevered beam. In contrast, if a relatively larger cable 460 is mounted within the gripping members 418, the deflection of the gripping members 418 is sufficient that the tips 418b of the gripping members 418 engage the arms 405 (see FIG. 10). In this instance, the gripping force imparted to the cable 460 by the gripping members 418 can be approximately calculated using Equation (3) above for a fixed-pinned beam, which of course produces a larger gripping force than a cantilevered beam. (It is noted that there may be some sliding of the tip 418b relative to the arm 405 as deflection increases, such that it is not a true "pinned" joint, but Equation (3) should still suffice for approximating the gripping force). Thus, the gripping members 418 of the cable hanger 410 can produce a higher gripping force for larger diameter cables, which presumably are heavier than smaller diameter cables.

Figure 11:
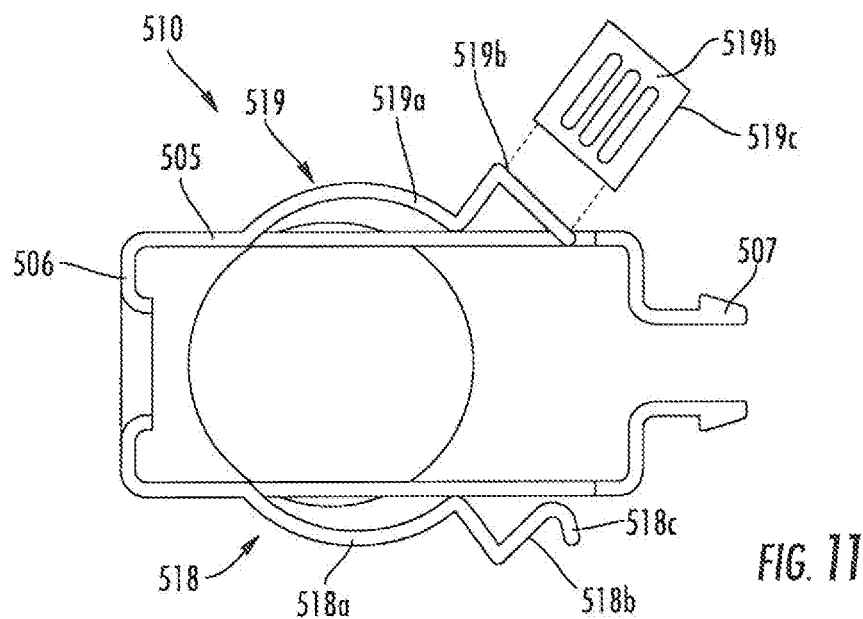
FIG. 11 is a partial top view of a cable hanger according to still further embodiments of the invention prior to securing of a cable.
Figure 12:
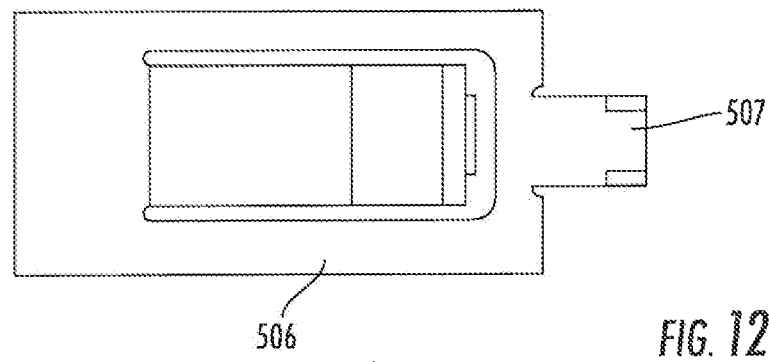
FIG. 12 is a side view of the cable hanger of FIG. 11
Figure 13:
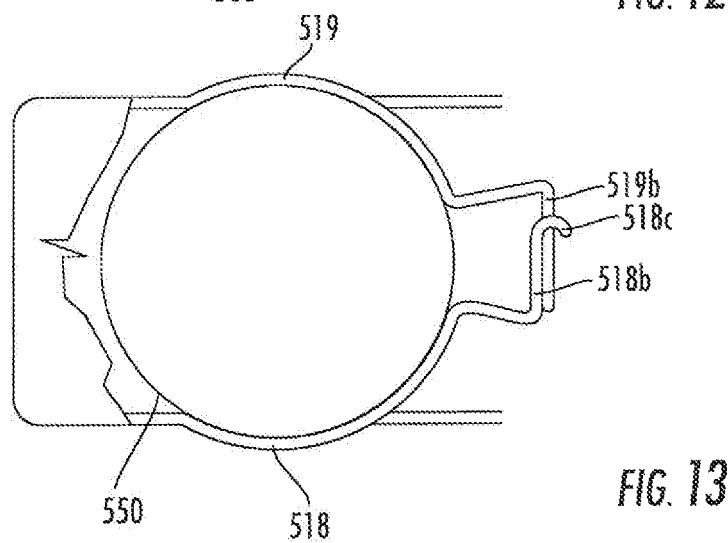
FIG. 13 is a top view of the cable hanger of FIG. 11 after securing of a cable.

Referring now to FIGS. 11-13, a further embodiment of a cable hanger, designated broadly at 510, is shown therein. The cable hanger 510 includes a base 506, arms 505 and locking projections 507 as discussed above. However, the cable hanger 510 includes two differently configured gripping members 518, 519. The gripping member 518 includes an arcuate section 518a and a radially-inwardly extending locking tab 518b with a hook 518c. The gripping member 519 has a similar arcuate section 519a, but has a locking panel 519b with horizontal slots 519c (shown in the inset of FIG. 11).

To mount a cable with the cable hanger 510, the locking projections 507 are spread to enable insertion of the cable 550 between the gripping members 518, 519. The free ends of the gripping members 518, 519 are then brought together, with the locking tab 518c of the gripping member 518 being inserted into an appropriate slot 519c of the gripping member 519 to grip the cable 550. The locking projections 507 are then inserted into a mounting hole of either a mounting structure or another cable hanger in the manner described above. The multiplicity of slots 519c can provide the cable hanger 510 with the flexibility to mount a variety of cable sizes.

Those of skill in this art will appreciate that locking features other than the locking tab 518 and the slotted locking panel 519b may be employed with cable hanger according to embodiments of the invention.

Figure 16:
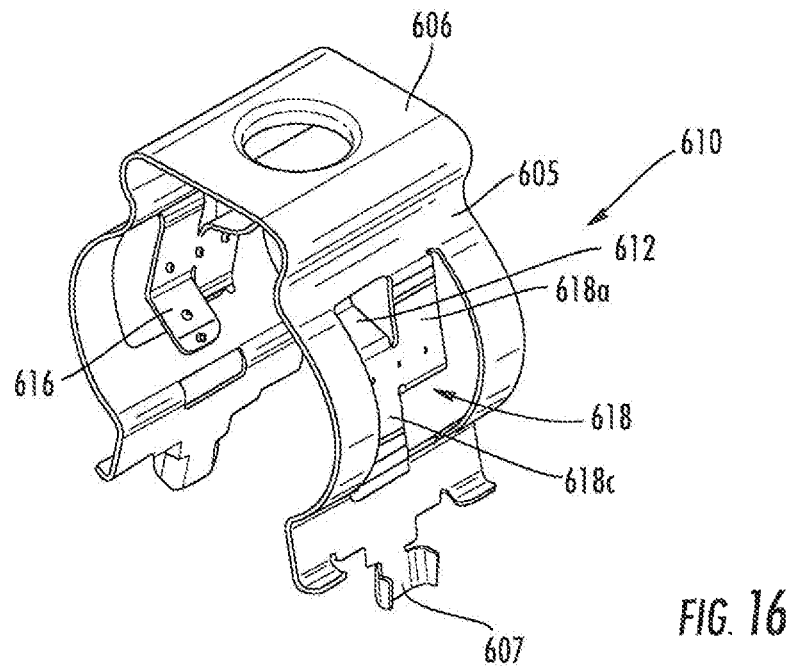
FIG. 16 is a perspective view of a cable hanger according to further embodiments of the invention.
Figure 17:
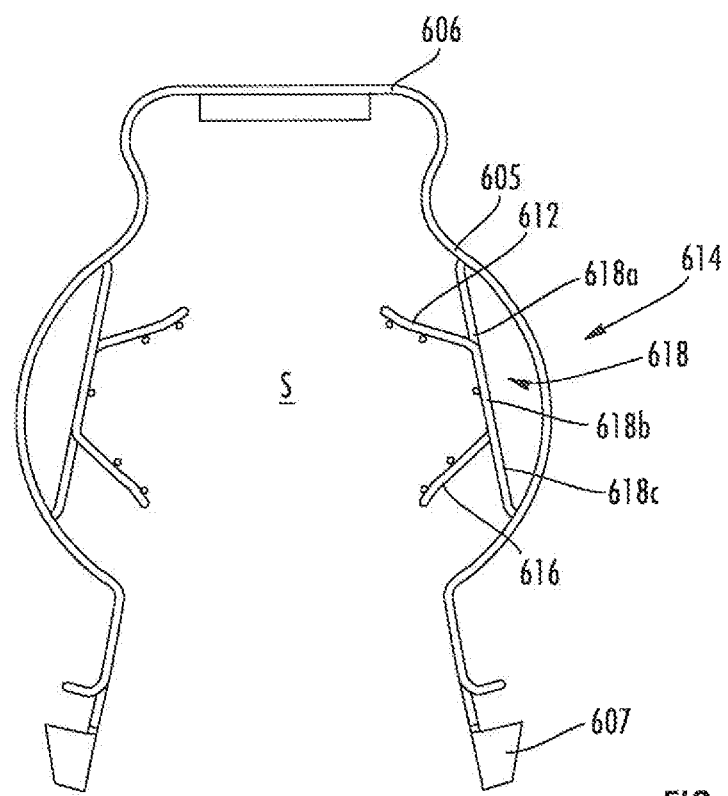
FIG. 17 is a top view of the cable hanger of FIG. 16.

Referring now to FIGS. 16 and 17, another embodiment of a cable hanger, designated broadly at 610, is shown therein. The cable hanger 610 is somewhat similar to the cable hanger 110, inasmuch as it has a base 606, curved arms 605 and locking projections 607 that resemble those of the hanger 110 discussed above. The cable hanger 610 also has flex members 618 that define chords across the arcuate sections 614 of the arms 605. However, as can be seen in FIG. 17, cantilevered gripping members 612, 616 extend from the flex members 618 and into the cable-gripping space S within the arms 605. It can also be seen in FIG. 16 that the flex members 618 are tripartite, with two vertically offset horizontal runs 618a, 618c merging with the arcuate sections 614 of the arms 605 and a vertical run 618b extending between the horizontal runs 618a, 618c. The gripping members 612, 616 extend from opposite sides of the vertical run 618b and are vertically offset from each other.

In use, the cable hanger 610 is employed in the same manner as the cable hanger 110; a cable is inserted into the space S between the arms 605, which are then closed around the cable as the locking projections 607 are inserted into a mounting hole. The cantilevered gripping members 612, 616 can help to grip and to center the cable within the space S. The presence of the flex members 618, which are fixed end beams like the gripping members 118 of the cable hanger 110, can provide additional gripping force in the manner described above in connection with the cable hanger 110.

Figure 18:
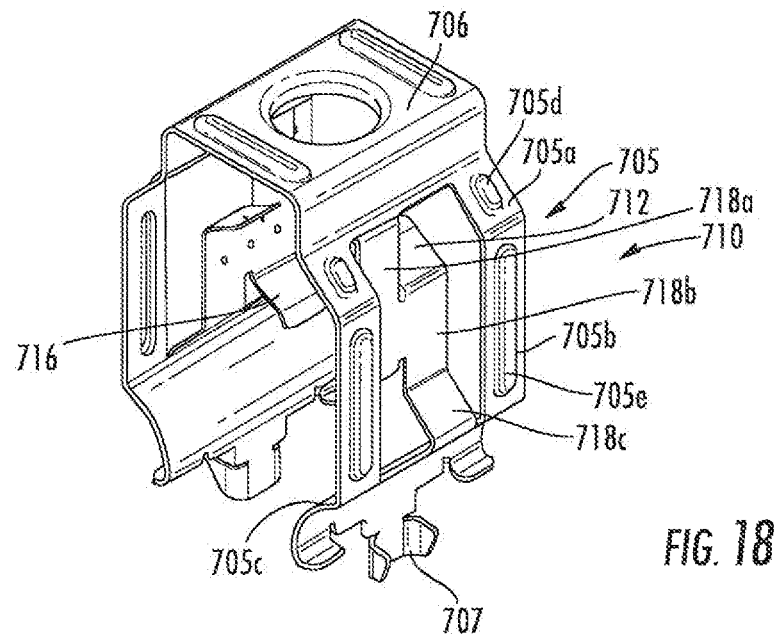
FIG. 18 is a perspective view of a cable hanger according to further embodiments of the invention.
Figure 19:
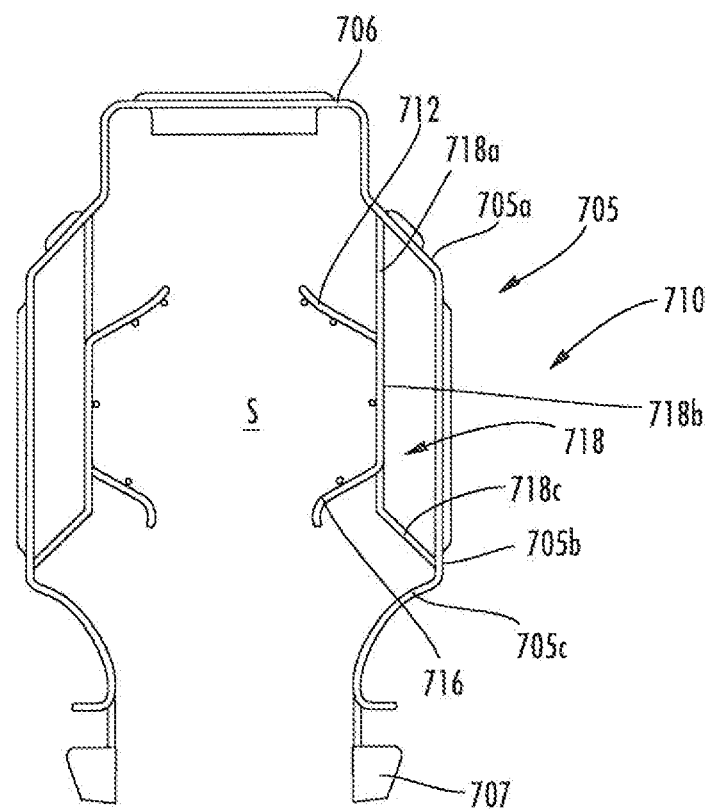
FIG. 19 is a top view of the cable hanger of FIG. 18.

Referring now to FIGS. 18 and 19, another embodiment of a cable hanger, designated broadly at 710, is shown therein. The cable hanger 710 is somewhat similar to the cable hanger 610 in that it includes a base 706, arms 705 and locking projections 707, as well as having tripartite flex members 718 with vertically offset cantilevered gripping members 712, 716. However, the arms 705 of the cable hanger 710 are not smoothly arcuate, but instead include straight sections 705a, 705b and a curved section 705c. Also, the flex members 718 are angled, with the horizontal run 718a emerging from the straight section 705a of the arm 705, and the horizontal run 718c being angled relative to the vertical run 718b to meet the straight section 705b. The straight sections 705a, 705b include raised ribs 705d, 705e to provide additional stiffness to the arms 705.

The cable hanger 710 is employed in the same manner as the cable hanger 610, with a cable being inserted into the space S between the arms 705 and being gripped by the gripping members 712, 716. Notably, the shapes of the straight sections 705a, 705b of the arms 705 and the horizontal runs 718a, 718c of the flex members 718 are selected so that a similar length of material is used for each (i.e., the combined lengths of the straight sections 705a, 705b are approximately the same as the combined lengths of the horizontal runs 718a, 718c) to facilitate stamping of the material and to maintain strength of the stamped material.

Figure 21:
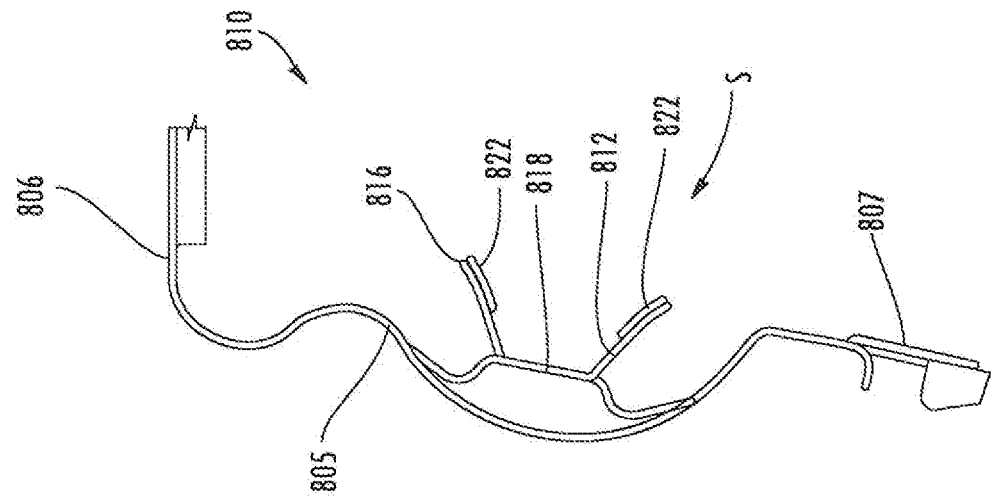
FIG. 21 is a top view of a portion of the cable hanger of FIG. 20.
Figure 20:
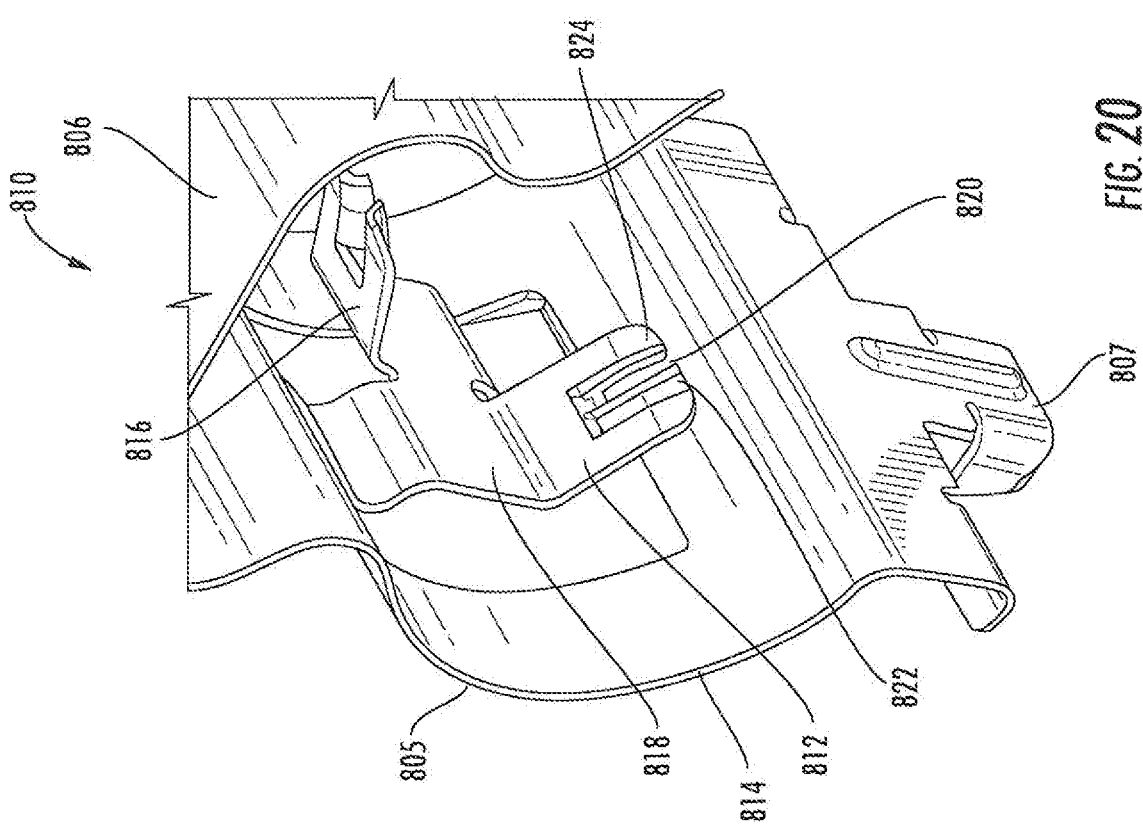
FIG. 20 is a perspective view of a portion of a cable hanger according to still further embodiments of the invention.

Referring now to FIGS. 20 and 21, another embodiment of a cable hanger, designated broadly at 810, is illustrated therein. The cable hanger 810 is similar to the cable hanger 610 of FIGS. 16 and 17 described above. The cable hanger 810 has a base 806, curved arms 805 and locking projections 807 that resemble those of the hanger 610 discussed above. The cable hanger 810 also has tripartite flex members 818 (only one of which is shown in FIGS. 20 and 21) that define chords across the arcuate sections 814 of the arms 805, with cantilevered gripping members 812, 816 extending from the flex members 818 and into the cable-gripping space S within the arms 805. However, in this embodiment each of the gripping members 812, 816 includes two longitudinal gripping flanges 822 at its free end. The gripping flanges 822 are located on each side of an open-ended slot 820 and extend with flat edges 824 into the space S between the arms 805.

In use, the cable hanger 810 is employed in the same manner as the cable hanger 610; a cable is inserted into the space S between the arms 805, which are then closed around the cable as the locking projections 807 are inserted into a mounting hole. The gripping flanges 822 improve the grip of the cable hanger 810 on the cable.

During installation, the flat edges 824 of the gripping flanges 822 can slide over the cable jacket relatively easily, as the sliding action occurs along the length of the flat edges 824. This configuration can facilitate installation compared to prior hangers that have included individual barbs rather than flanges, as the barbs tend to "hang up" on the cable jacket as the hanger is slid into place. Once in position, the gripping flanges 822 can provide superior gripping force to hangers that employ a coined edge as a gripping feature. Moreover, the presence of the gripping flanges 822 increases the moment of inertia of the gripping members 812, 816, which stiffens the gripping members 812, 816 and thereby increases the gripping force.

Those of skill in this art will appreciate that other configurations of gripping flanges may be employed. For example, in some embodiments only one of the gripping members 812, 816 may include a gripping flange, or only one gripping flange may be included on each gripping member. The length and height of the gripping flanges may vary. Other variations may also be suitable.

Those skilled in this art will appreciate that the cable hangers discussed above are typically formed of a metallic material, such as steel, and may be formed as a unitary member (often from a flat blank stamped from sheet steel and bent into a desired shape).

Also, it will be apparent to those of skill in this art that the cable hangers 110, 210, 310, 410, 510, 610, 710, 810 can be arranged in a "stacked" relationship by inserting the locking projections of one cable hanger into the mounting hole in the base of a second cable hanger in the manner described above with respect to cable hanger 10. The second cable hanger may be identical to or different from the first cable hanger as needed for hanging the cable in question.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable hanger for securing a cable to a supporting structure having an aperture, said cable hanger comprising:
    a base panel having opposed ends;
    a pair of arms, each of the arms attached to a respective end of the base panel and having a free end;
    a pair of locking projections, each of the locking projections attached to a respective free end of the arms; and
    a pair of gripping members, each gripping member having opposed ends, wherein one of the ends is fixed to a respective arm or to the base panel, and wherein the other of the ends is a free end positioned to engage a cantilevered feature mounted to the arm;
    wherein the arms and locking projections are configured to spread apart to enable insertion of a cable between the arms, wherein the gripping members engage and grip the cable, and wherein the locking projections are configured to be inserted into the aperture of the supporting structure; and
    wherein, when a cable of sufficient diameter is gripped by the gripping members, each of the gripping members deflects to engage the cantilevered feature to form a joint.

2. The cable hanger defined in claim 1, wherein the free end of the gripping member has a bent tip, and wherein the cantilevered feature is a brace extending from the arm.

3. The cable hanger defined in claim 1, wherein the fixed end of each gripping member is fixed to a respective arm.

4. The cable hanger defined in claim 1, wherein each of the gripping members forms a pinned joint with the cantilevered feature.

5. The cable hanger defined in claim 1, formed as a unitary member.

6. The cable hanger defined in claim 1, wherein the base panel has a mounting hole.

7. The cable hanger defined in claim 6, wherein the mounting hole has a nominal diameter of ¾ inch.

8. A cable hanger for securing a cable to a supporting structure having an aperture, said cable hanger comprising:
    a base panel having opposed ends, the base panel including a mounting hole;
    a pair of arms, each of the arms attached to a respective end of the base panel and having a free end;
    a pair of locking projections, each of the locking projections attached to a respective free end of the arms; and
    a pair of gripping members, each gripping member having opposed ends, wherein one of the ends is fixed to a respective arm or to the base panel, and wherein the other of the ends is a free end positioned to engage a cantilevered brace mounted to and extending from the arm;
    wherein the arms and locking projections are configured to spread apart to enable insertion of a cable between the arms, wherein the gripping members engage and grip the cable, and wherein the locking projections are configured to be inserted into the aperture of the supporting structure; and
    wherein, when a cable of sufficient diameter is gripped by the gripping members, each of the gripping members deflects to engage the respective brace to form a joint.

9. The cable hanger defined in claim 8, wherein each of the gripping members forms a pinned joint with the respective brace.

10. The cable hanger defined in claim 9, formed as a unitary member.

11. The cable hanger defined in claim 9, wherein the mounting hole has a nominal diameter of ¾ inch.

12. A cable hanger for securing a cable to a supporting structure having an aperture, said cable hanger comprising:
    a base panel having opposed ends;
    a pair of arms, each of the arms attached to a respective end of the base panel and having a free end;
    a pair of locking projections, each of the locking projections attached to a respective free end of the arms; and
    a pair of gripping members, each gripping member having opposed ends, wherein one of the ends is fixed to a respective arm or to the base panel, and wherein the other of the ends is a free end positioned to engage a cantilevered feature mounted to the arm, the free end having a bent tip that engages the cantilevered feature;
    wherein the arms and locking projections are configured to spread apart to enable insertion of a cable between the arms, wherein the gripping members engage and grip the cable, and wherein the locking projections are configured to be inserted into the aperture of the supporting structure; and wherein, when a cable of sufficient diameter is gripped by the gripping members, each of the gripping members deflects to engage the cantilevered feature to form a joint.

13. The cable hanger defined in claim 12, wherein each of the bent tips of the gripping members forms a pinned joint with the cantilevered feature.

14. The cable hanger defined in claim 12, formed as a unitary member.

15. The cable hanger defined in claim 12, wherein the base panel has a mounting hole.

16. The cable hanger defined in claim 15, wherein the mounting hole has a nominal diameter of ¾ inch.

\* \* \* \* \*